United States Patent [19]

Slavinsky et al.

[11] 4,227,451
[45] Oct. 14, 1980

[54] DEVICE FOR DELIVERY OF BULK MATERIALS

[76] Inventors: Valentin N. Slavinsky, prospekt Shvernika, 10, kv. 101, Leningrad; Genrikh V. Bairon, ulitsa Proletarskaya, 131, kv. 77, Leningrad, Kolpino; Adolf M. Alexandrov, Federativny prospekt, 6, korpus 3, kv. 8, Moscow; Gennady M. Alexeev, Sredny prospekt, 61, kv. 55, Leningrad; Alexandr F. Savenok, ulitsa Kurlyandskaya, 38, kv. 15, Leningrad; Vladimir M. Matveev, Staro-Orlovskaya ulitsa, 35, kv. 1, Leningrad; Fedor E. Elin, V.O., 5 linia, 4, kv. 45, Leningrad; Gennady B. Provalsky, ulitsa Gastello, 10, kv. 31, Leningrad; Boris P. Shulbakh, ulitsa Dekskaya, 62, korpus 3, kv. 18, Leningrad; Jury A. Tsimbler, Sojuzny prospekt, 10, kv. 26, Moscow, all of U.S.S.R.

[21] Appl. No.: 958,171
[22] Filed: Nov. 6, 1978
[51] Int. Cl.³ .............................................. B30B 11/00
[52] U.S. Cl. .................................. 100/295; 100/148; 406/56
[58] Field of Search ................. 100/DIG. 3, 249, 145, 100/148, 295; 406/50, 56

[56] References Cited

U.S. PATENT DOCUMENTS

| 1,346,293 | 7/1920 | Bernert | 406/56 |
| 2,793,914 | 5/1957 | Gardeniers | 406/56 |
| 2,973,993 | 3/1961 | Delagrange | 406/56 |
| 3,948,167 | 4/1976 | Defeudis | 100/249 X |

FOREIGN PATENT DOCUMENTS

| 2112656 | 9/1972 | Fed. Rep. of Germany | 100/249 |
| 701876 | 1/1954 | United Kingdom | 406/50 |

Primary Examiner—Billy J. Wilhite
Attorney, Agent, or Firm—Lackenbach, Lilling & Siegel

[57] ABSTRACT

A device for the delivery of bulk materials into the suction pipe of a pneumatic transport installation comprises a vertical pipe designed for charging the bulk material, and a closing element installed on its lower end and placing the charging pipe into communication with the suction pipe of the installation. The closing element comprises a cylindrical shell with a coaxially built in sleeve, the inside diameters of both the shell and the sleeve being approximately equal to the inside diameter of the charging pipe, and a helical band located in said shell. The pitch of the helical band is close to the diameter of the shell and its width at the end facing an under-band portion of the shell is equal to the radius of said shell. The band is connected to said sleeve which is kinematically linked with a reversible drive for joint rotation with it so that, when rotating in one direction, the helical band compacts the bulk material in the under-band portion of the shell until said portion is completely filled. When rotating in the opposite direction, the band forms the face surface of the compacted bulk material for making a briquette which extends wall-to-wall across the shell.

7 Claims, 6 Drawing Figures

DEVICE FOR DELIVERY OF BULK MATERIALS

FIELD OF THE INVENTION

The present invention relates to devices for the delivery of bulk materials into the suction pipe of a pneumatic transport installation.

The device according to the present invention will find most useful application in installations for pneumatic and vacuum transportation of garbage and domestic waste from residential buildings and cultural and public-service institutions.

DESCRIPTION OF THE PRIOR ART

Known in the prior art are devices for the delivery of domestic waste into the suction pipe of pneumatic transport installations.

These devices consist of a vertical pipe for charging the domestic waste and a closing element mounted in the lower end of said pipe and putting it periodically in communication with the suction pipe of the installation.

The closing element of the prior art devices is made of a gate valve tightly closing the suction pipe and accumulating the bulk domestic waste in the waste charging pipe.

As the waste accumulates gradually in the pipe above the closing element the closing element is periodically opened thereby putting the charging pipe in communication with the suction pipe so that the waste enters the suction pipe in bulk and is carried where required.

In the above-described devices for the delivery of bulk materials in the pneumatic transport installations the suction pipes have comparatively large diameters (400-500 mm and over) which increases the overall dimensions of the installation and requires, in addition, considerable velocities of the transporting air (25-35 m/s) which, in turn, involves the use of powerful air blower plants. After opening the closing element and during the delivery of domestic waste into the suction pipe of these installations there arise loud aerodynamic noises (100 db and over) which requires the introduction of noise-suppressing devices and thereby raises the cost of the pneumatic transport installation.

OBJECTS OF THE INVENTION

An object of the present invention is to provide a device for the delivery of bulk materials into the suction pipe of a pneumatic transport installation wherein the closing element is designed so as to permit the forming of briquettes from the bulk material prior to delivering it into the suction pipe and to allow the charging pipe to be permanently and reliably separated from the suction pipe.

Another object of the present invention is to reduce the overall dimensions of the pneumatic transport installation.

Still another object of the present invention is to reduce the capacity of air blower plants.

One more object of the present invention is to decrease the aerodynamic noises arising when the bulk materials are being delivered into the suction pipe.

SUMMARY OF THE INVENTION

In accordance with these and other objects, we hereby disclose a device for the delivery of bulk materials into the suction pipe of a pneumatic transport installation comprising a vertical pipe designed for charging the bulk material, and a closing element installed on its lower end and placing said charging pipe into communication with the suction pipe of the installation according to the invention, the closing element comprises a cylindrical shell with a coaxially built-in sleeve, the inside diameters of the shell and the sleeve being approximately equal to the inside diameter of the pipe. A helical band is arranged in said shell and has a pitch approaching the diameter of the shell and a width at its end facing the suction pipe and the under-band portion of the shell being equal to the shell radius. The band is connected with said sleeve which is linked kinematically with a reversible drive for joint rotation so that, when rotating in one direction, the band ensures compaction of the bulk material in the under-band portion of the shell until said portion is completely filled. When rotating in the opposite direction, the band forms the face surface of the compacted bulk material and thereby makes a briquette which extends wall-to-wall across the shell.

It is preferable that the sleeve should be built into the shell at its end facing the vertical pipe.

Such a layout is the simplest one.

It is likewise preferable that the shell should be made of two sections and the sleeve should be built-in between them, with the helical band located in the shell section adjoining the charging pipe.

Such an arrangement of the sleeve and helical band will promote the stability of briquette dimensions.

In addition, it is also preferable that the end of the helical band facing the charging pipe should be as narrow as possible.

Such a design of the helical band will ensure more effective catching of domestic waste and its delivery into the under-band portion of the band until said portion is completely filled.

The device for the delivery of bulk materials into the suction pipe of a pneumatic transport installation according to the present invention makes it possible to produce briquettes from the bulk materials and convey them through a suction pipe of a comparatively smaller diameter than that in the prior art installation, thereby permitting employment of comparatively low velocities of transportation air and, as a consequence, less powerful air blower plants.

The claimed device eliminates the noise generated in the installation when the briquette is fed into the suction pipe due to the constant presence of the next formed briquette which separates the charging pipe from the suction pipe.

BRIEF DESCRIPTION OF THE DRAWINGS

The invention will now be described by way of example with reference to the accompanying drawings, wherein.

DETAILED DESCRIPTION OF THE INVENTION

Figures 1, 2:
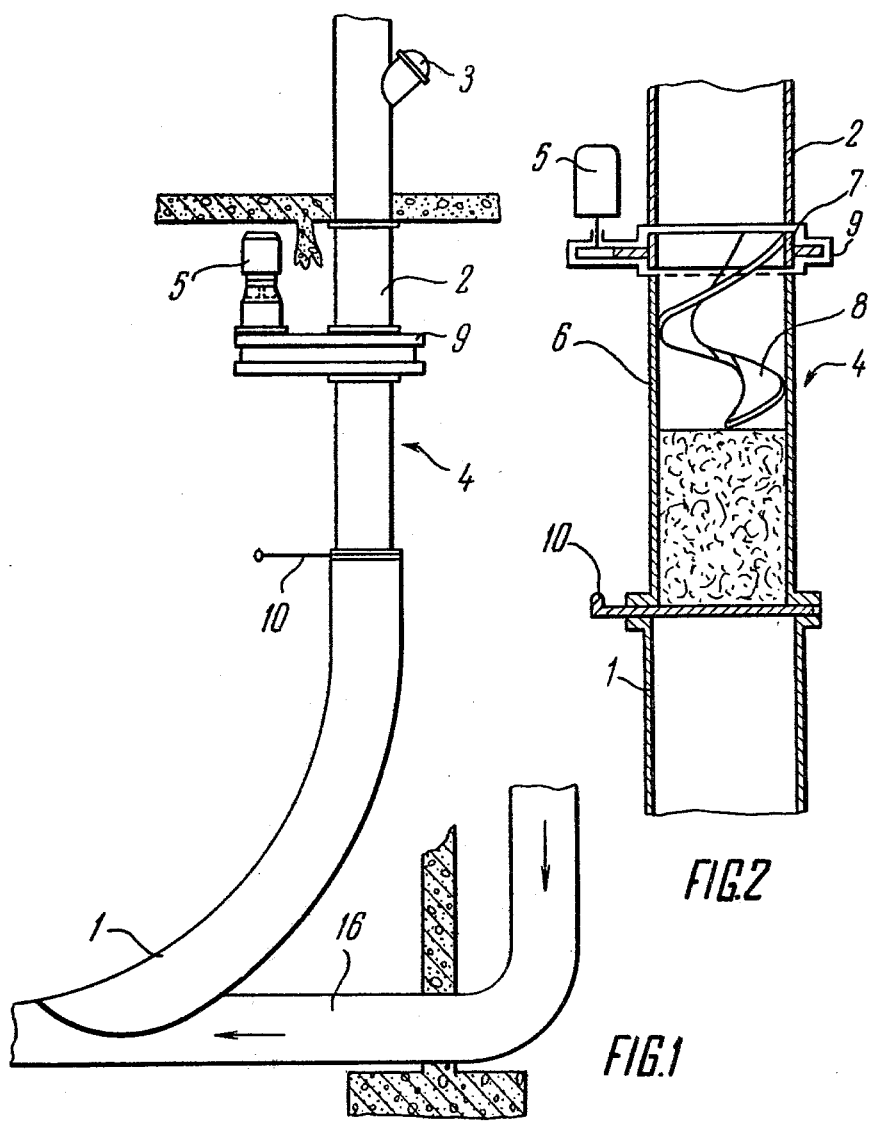
FIG. 1 is a side view of the device for the delivery of bulk material according to the invention.
FIG. 2 is an enlarged, longitudinal cross-sectional view showing the closing element wherein the sleeve is built between the closing element and the charging pipe.

This particular example discloses a device for the delivery of bulk materials constituted by domestic waste.

The device for the delivery of domestic waste into the suction pipe 1 (FIG. 1) of a pneumatic transport installation comprises a vertical pipe 2 designed for charging the domestic waste through a charging hatch 3, and a closing element 4 with a reversible drive 5.

The closing element 4 is located between the charging pipe 2 and the suction pipe 1 and comprises a cylindrical shell 6 (FIG. 2) with a coaxially built-in sleeve 7 and a helical band 8. The sleeve is located at the upper end (in the drawing) of the shell 6 and is linked kinematically with the reversible drive 5 for rotation by it. The sleeve 7 is protected by a housing 9. The inside diameters of the sleeve 7 and shell 6 approach closely, and are approximately equal to, the inside diameter of the pipe 2.

Cantilevered on the internal surface of the sleeve 7 is the helical band 8 occupying a portion of the length of the shell 6. The other portion of the shell 6 under the band is empty and it is there that a briquette is formed from domestic waste.

The pitch of the helical band 8 is close in value to the diameter of the shell 6. The width of the band 8 at its end facing the charging pipe 2 is considerably smaller than the radius of the shell 2, and its width at the end facing the briquette-forming portion of the shell 6 is equal to the radius of said shell 6.

This width of the end of the band 8 ensures smoothing out of the face surface of the formed briquette during rotation of the helical band 8 in the reverse direction. Installed between the shell 6 and the suction pipe 1 is a gate valve 10 which covers the suction pipe 1 during the compaction of the first briquette.

The helical band 11 (FIGS. 3 and 4) at the end facing the charging pipe 2 has a minimum permissible width for better catching of the domestic waste from the pipe 2. The minimum width of this end of the helical band 11 is selected on the basis of actual technological conditions.

Figures 3, 4, 5:
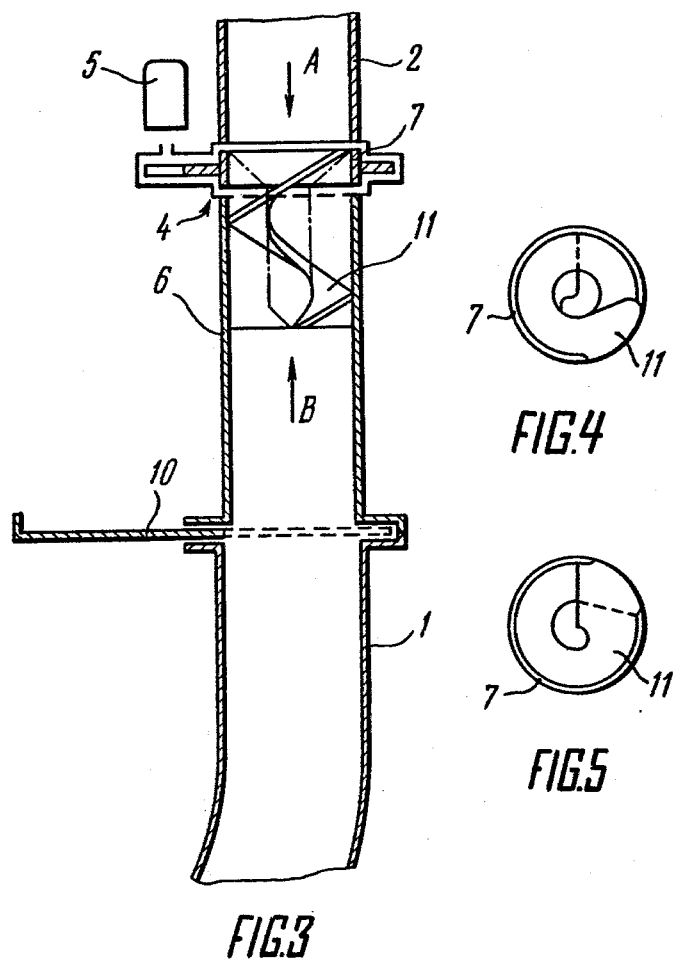
FIG. 3 is an enlarged, longitudinal cross-sectional view showing the helical band whose end facing the charging pipe has a minimum width.
FIG. 4 is a view in the direction of arrow A in FIG. 3.
FIG. 5 is a view in the direction of arrow B in FIG. 3.

The width of the end of the helical band 11 facing the suction pipe 1 is equal to the radius of the shell, as shown in FIG. 5.

Figure 6:
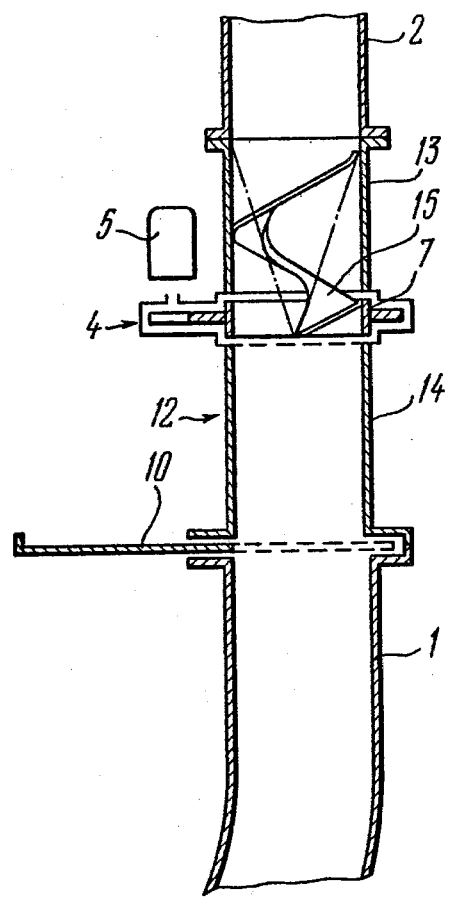
FIG. 6 is an enlarged, longitudinal cross-sectional view showing the closing element whose sleeve is built between the two sections of the shell.

In the device for the delivery of domestic waste illustrated in FIG. 6 the body 12 of the closing element 4 is made up of two sections 13 and 14 and the sleeve 7 is located between these sections. The helical band 15 is located in the upper section 13 of the shell 12 (in the drawing) so that its free end faces the pipe 2 and has a minimum width, and its opposite end, whose width is equal to the radius of the shell 12, is connected with the sleeve 7 for joint rotation therewith. Such a design of the closing element 4 permits making briquettes with more stable dimensions.

The inside diameter of the suction pipe 1 is somewhat larger than the inside diameter of the shell 6 (12) to provide easy sliding of the briquette as it moves through said pipe, and its shell ensures free movement of the briquette from the suction pipe 1 into the main pipeline 16 (FIG. 1).

The device functions as follows.

At the beginning of operation, i.e. during shaping of the first briquette, the domestic waste moves through the charging hatch 3 into the pipe 2. Meanwhile, the gate valve 10 is closed. Small particles of domestic waste move through the sleeve 7 and the helical band 8 of the closing element 4 and are trapped in the under-band or free portion of the shell 6 by the gate valve 10, the larger particles accumulating above the helical band 8 in the pipe 2.

As the amount of domestic waste accumulated above the closing element 4 becomes sufficient for making a briquette, the reversible drive 5 is turned on, and the helical band 8 starts rotating and moving the domestic waste from the pipe 2 into the free portion of the shell 6 towards the gate valve 10.

As the domestic waste is being moved by the helical band 8 into the free portion of the shell 6, the end of the helical band 8 located in this portion of the shell 6 compacts the waste until the free portion of the shell 6 becomes completely filled.

Then the drive 5 is reversed and the helical band 8 starts rotating in the opposite direction, thus forming a smooth face surface of the compacted waste and a well-shaped briquette extending wall-to-wall across the shell 6.

After forming the briquette the reversible drive is deactivated and the gate valve 10 is pulled out, thereby placing the shell 6 in communication with the suction pipe 1.

In the course of compacting the next briquette the preceding briquette extending across the shell 6 serves as a gate valve.

The just-formed briquette is moved into the suction pipe 1 in the course of making the next briquette for which purpose the reversible drive 5 is activated after the amount of waste accumulated above the helical band 8 becomes sufficient for making a briquette.

When rotating, the helical band 8 entrains the domestic waste from the pipe 2 and moves it to the face surface of the formerly compacted briquette which moves gradually in the shell 6 towards the suction pipe 1 and offers a certain resistance to the incoming water, thus ensuring its compaction in the under-band portion of the shell 6.

After the just-formed briquette has left the shell 6 and entered the suction pipe 1, the reversible drive 5 is switched over to rotate the helical band 8 in the reverse direction for making a smooth face surface of the compacted waste and forming a new briquette which is also held in the shell 6 due to the side thrust.

The minimum possible width of the helical band 11 (15) at the end facing the pipe 2 makes for more efficient catching of domestic waste and delivering it into the under-band portion of the shell 6 (12).

The gate valve 10 serves for making only the first briquette because later its function is fulfilled by the preceding briquettes which close the shell 6 (12) constantly and tightly, thereby separating the pipe 2 from the operating suction pipe 1 which prevents penetration of aerodynamic noises from the suction pipe 1 into the pipe 2.

The device for the delivery of domestic waste illustrated in FIG. 6 functions similarly to that described above.

The device for the delivery of domestic waste according to the present invention is adapted for briquetting domestic waste whose fractions can reach the dimensions approaching the diameter of the charging pipe and eliminates the building-up of the waste above the helical band.

In describing the present embodiment of the invention the terms in their narrow sense are used for the sake of clarity. However, the invention is not confined to the narrow sense of the terms used and it will be understood that each of said terms embraces all the equivalent elements functioning similarly and employed for the same purposes.

What is claimed is:

1. A device for the delivery of bulk material into a suction pipe of a pneumatic transport installation comprising:
    a charging pipe into which said bulk material is introduced;
    a closing element positioned between said charging pipe and said suction pipe and comprising a cylindrical shell, an inside diameter of said shell being approximately equal to an inside diameter of said charging pipe;
    a gate valve positioned between said shell and said suction pipe;
    a sleeve rotatably and coaxially built in said shell, an inside diameter of said sleeve being approximately equal to said inside diameter of said shell;
    a reversible drive kinematically linked with said sleeve for rotation of said sleeve; and
    a helical band having a first end rigidly connected to said sleeve and being positioned in an upper portion of said shell, said band being mounted for joint rotation with said sleeve, a forming portion of said shell being defined in a portion of said shell under said band;
    wherein during forward rotation of said band, said bulk material is compacted in said forming portion of said shell and, during backward rotation of said band, the compacted bulk material is formed into a briquette extending across the entire inside diameter of said shell; and
    said gate valve is opened after a first briquette is formed, so that the formation of a second briquette will force said first briquette into said suction pipe.

2. A device according to claim 1, wherein said sleeve is built into an upper end of said shell which faces said charging pipe.

3. A device according to claim 1, wherein the pitch of said band is approximately equal to said inside diameter of said shell; and the width of said first end of said band is smaller than a radius of said shell, and the width of a second end of said band is approximately equal to the radius of said shell.

4. A device according to claim 3, wherein said second end of said band is near said forming portion of said shell.

5. A device according to claim 1, wherein said shell includes upper and lower sections, said sleeve being positioned between said upper and lower sections and said band being located in said upper section; and the pitch of said band is approximately equal to the inside diameter of said shell, the width of said first end of said band is approximately equal to a radius of said shell.

6. A device according to claim 5, wherein said second end of said band is near said charging pipe.

7. A device according to claim 1, wherein an inside diameter of said suction pipe is larger than said inside diameter of said shell.

* * * * *